(12) United States Patent
Saquib et al.

(10) Patent No.: US 9,811,881 B2
(45) Date of Patent: Nov. 7, 2017

(54) OFF-BAND RESOLUTION EMHANCEMENT

(71) Applicant: Goodrich Corporation, Charlotte, NC (US)

(72) Inventors: Suhail Shabbir Saquib, Shrewsbury, MA (US); Christopher Gittins, Bedford, MA (US)

(73) Assignee: Goodrich Corporation, Charlotte, NC (US)

( * ) Notice: Subject to any disclaimer, the term of this patent is extended or adjusted under 35 U.S.C. 154(b) by 15 days.

(21) Appl. No.: 14/964,080

(22) Filed: Dec. 9, 2015

(65) Prior Publication Data

US 2017/0169543 A1    Jun. 15, 2017

(51) Int. Cl.
| | |
|---|---|
| G06K 9/00 | (2006.01) |
| G06T 3/40 | (2006.01) |
| G06T 5/20 | (2006.01) |
| G06T 5/50 | (2006.01) |
| G06T 7/00 | (2017.01) |
| G06T 5/00 | (2006.01) |

(52) U.S. Cl.
CPC .......... *G06T 3/4007* (2013.01); *G06T 3/4023* (2013.01); *G06T 3/4061* (2013.01); *G06T 5/003* (2013.01); *G06T 5/20* (2013.01); *G06T 5/50* (2013.01); *G06T 7/0097* (2013.01); *G06T 2207/20016* (2013.01); *G06T 2207/20076* (2013.01); *G06T 2207/20081* (2013.01); *G06T 2207/20128* (2013.01); *G06T 2207/20221* (2013.01)

(58) Field of Classification Search
CPC ... G06T 3/4023; G06T 3/4007; G06T 3/4061; G06T 5/003; G06T 5/20; G06T 5/50; G06T 7/0097; G06T 2207/20076; G06T 2207/20221; G06T 2207/20016; G06T 2207/20081; G06T 2207/20128
See application file for complete search history.

(56) References Cited

U.S. PATENT DOCUMENTS

| | | |
|---|---|---|
| 5,949,914 A | 9/1999 | Yuen |
| 6,011,875 A | 1/2000 | Laben et al. |
| 6,937,774 B1 | 8/2005 | Specht et al. |
| 7,095,420 B2 | 8/2006 | Burky et al. |
| 8,320,712 B2 | 11/2012 | Choi et al. |
| 9,047,684 B2 | 6/2015 | Lelescu et al. |

(Continued)

OTHER PUBLICATIONS

Extended European Search Report issued in corresponding European Patent Application No. EP16203154.6, dated Apr. 5, 2017.

(Continued)

*Primary Examiner* — Yon Couso
(74) *Attorney, Agent, or Firm* — Locke Lord LLP; Scott D. Wofsy; Joshua L. Jones (57) ABSTRACT

A method of enhancing an image includes increasing sampling rate of a first image to a target sampling rate to form an interpolated image. The method also includes processing a second image through a high pass filter to form a high pass features image, wherein the second image is at the target sampling rate. The method also includes extracting detail from the high pass features image relevant to the first image, merging the detail from the high pass features image with the interpolated image to form a prediction image at the target sampling rate, and outputting the prediction image.

17 Claims, 4 Drawing Sheets

(56) References Cited

U.S. PATENT DOCUMENTS

| | | | |
|---|---|---|---|
| 2003/0093279 A1* | 5/2003 | Malah | G10L 21/038 704/265 |
| 2005/0094887 A1 | 5/2005 | Cakir et al. | |
| 2005/0111754 A1 | 5/2005 | Cakir et al. | |
| 2005/0184730 A1* | 8/2005 | Tamez-Pena | A61B 5/055 324/302 |
| 2007/0206103 A1* | 9/2007 | Coifman | H04N 9/045 348/272 |
| 2014/0368688 A1* | 12/2014 | John Archibald | H04N 5/23241 348/222.1 |

OTHER PUBLICATIONS

Dalla Mura Mauro et al., "Context-adaptive Pansharpening based on binary partition tree segmentation", 2014 IEEE International Conference on Image Processing, Oct. 27, 2014, pp. 3924-3928.

Bin Luo et al., "Pansharpening with a decision fusion based on the local size information", 2010 17IEEE International Conference on Image Processing, Sep. 26, 2010, pp. 1977-1980.

Suyu Wang et al., "Spectral imagery super resolution by using of a high resolution panchromatic image", Computer Science and Information Technology, 2010 3rd IEEE International Conference on IEEE, Jul. 9, 2010, pp. 220-224.

Bruno Aiazzi et al., "Context-Driven Fusion of High Spatial and Spectral Resolution Images Based on Oversampled Multiresolution Analysis", IEEE Transations on Geoscience and Remote Sensing, IEEE Service Center, vol. 40, No. 10, Oct. 1, 2002.

\* cited by examiner

OFF-BAND RESOLUTION EMHANCEMENT

BACKGROUND OF THE INVENTION

1. Field of the Invention

The present disclosure relates to image processing, and more particularly to image enhancement such as used in systems with multi-spectral sensors.

2. Description of Related Art

Remote sensing systems may acquire different spectral bands at different spatial resolutions. This is primarily due to a trade-off between the signal-to-noise ratio (SNR) and spatial/spectral resolution of the captured imagery. The SNR of the image depends on the amount of light (photons) captured by the sensor. The SNR can therefore be improved by opening up the spectral bandwidth to let in more light and/or increasing the size of the pixel, which reduces the spatial resolution. Consequently broad-band photographic imagery can afford to have smaller pixels and hence increased spatial resolution as compared to narrow-band hyper-spectral imagery. Optimal spatial sampling resolution is also dictated by the modulation transfer function (MTF) of the optics, which is wavelength dependent. Longer wavelength light has inherently reduced spatial resolution so long-wave bands can be sampled using larger pixels without any loss of information. The reduced spatial resolution at longer wavelengths serves both to improve the SNR as well as the transmission bandwidth of the collected imagery. For mixed modality imagery such as LIDAR, synthetic aperture radar (SAR), and hyper-spectral imagery (HSI), the optimal spatial resolution is dictated by the underlying physics and technology. Consequently imagery from different modalities will typically vary in the captured spatial resolution.

It is often desirable to increase the spatial resolution of low-resolution imagery to match the resolution of high resolution imagery both within and across remote sensing systems. Some methods involve using a higher resolution image to enhance a lower resolution image where both images were obtained at different bands by a multi-spectral sensor. Such methods only work when there is a spectral overlap between the high-resolution band and the low-resolution band. These techniques use information from the high resolution band, and the amount of sharpening applied to the low-resolution image cannot be controlled. Some solutions to these problems have been implemented, such as Gram-Schmitt spectral sharpening. However this still suffers to some extend from the limitations explained above.

Such conventional methods and systems have generally been considered satisfactory for their intended purpose. However, there is still a need in the art for improved image enhancement. The present disclosure provides a solution for this need.

SUMMARY OF THE INVENTION

A method of enhancing an image includes increasing sampling rate of a first image to a target sampling rate to form an interpolated image, wherein the first image is from a first spectral band. The method also includes processing a second image from a second spectral band through a high pass filter to form a high pass features image, wherein the second image is at the target sampling rate. The method also includes extracting detail relevant to the first image from the high pass features image, merging the detail from the high pass features image with the interpolated image to form a prediction image at the target sampling rate, and outputting the prediction image.

The method can include processing at least one additional image through a high pass filter to form at least one respective additional high pass features image, and extracting detail from the at least one additional high pass features image, wherein merging the detail from the high pass features image with the interpolated image includes merging detail from the at least one additional high pass features image to form the prediction image. The at least one additional image can be from at least one respective additional spectral band. The at least one additional image can be at a higher resolution than the first image. The first and second bands can be overlapping or non-overlapping, and the at least one additional spectral band can be overlapping or non-overlapping with the first and second bands.

Extracting detail from the high pass features image relevant to the first image can be done on a segment by segment basis from the high pass features image for use in merging with the interpolated image, wherein extracted detail for each segment is governed by individualized prediction coefficients. Detail extraction can include receiving an image segmentation map for the high pass features image and receiving prediction coefficients corresponding to respective segments of the image segmentation map for extracting detail on a segment by segment basis. The segmentation map can be produced by sub-dividing the pixels of first and second image into regions based on some similarity criterion. For multi-spectral images, the criterion can be spectral similarity within each segmented region. If the segments cover a large image area, they may be further sub-divided into smaller regions to better capture the changing characteristics of the image. The coefficients can be constant within each segment, wherein the segments are sub-divided to only span a local region.

Receiving the image segmentation map and receiving the prediction coefficients can include receiving the image segmentation map and prediction coefficients from a training operation, wherein the training operation includes creating a reduced sampling rate copy of the second image. The training operation can also include processing the reduced sampling rate copy of the second image and the first image through a high pass filter to form second and first feature images respectively, and processing the reduced sampling rate copy of the second image and the first image through a segmentation operation to produce the segmentation map. The training operation can further include processing the first and second feature images and the segmentation map through a fit process to generate the prediction coefficients.

Creating a reduced copy of the second image can include creating a reduced sampling rate copy of at least one additional image. The segmentation map and prediction coefficients can be based on the second image and the at least one additional image. Extracting detail from the high pass features image can include increasing the sampling rate of the segmentation map to the target sampling rate. Processing the second image through a high pass filter can include decimating the second image to a reduced sampling rate and then interpolating back to the target sampling rate and subtracting this result from the second image to the produce the high pass features image.

Merging the detail from the high pass features image with the interpolated image to form a prediction image at the target sampling rate is governed by $$Y_s^{(e)} = Y_s^{(l)} + \alpha X_s C_s,$$

where the matrix $Y_s^{(l)}$ denotes the data in segment s of the interpolated image and $Y_s^{(e)}$ denotes the prediction image for segment s, $X_s$ is a matrix of detail data extracted from the high pass features image for segment s, $C_s$ is a matrix of prediction coefficients for segment s, and α is a sharpening gain. For example, a user can designate α=1. The method can include generating a segmentation map based on the first and second images, wherein the segmentation map is created at the target sampling rate and is decimated into a reduced rate segmentation map for use in extracting detail from the high pass features image on a segment by segment basis. The segmentation map can be generated based on the interpolated image and the second image, wherein the second image and the interpolated image are processed through a segmentation algorithm to produce a segmentation map at the target sampling rate for use in extracting detail from the high pass features image on a segment by segment basis. The first image can be from a first modality, the second image can be from a second modality, and the first and second modalities can be different from one another.

A system for enhancing images includes a module configured to implement machine readable instructions to perform any embodiment of the operations described above.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
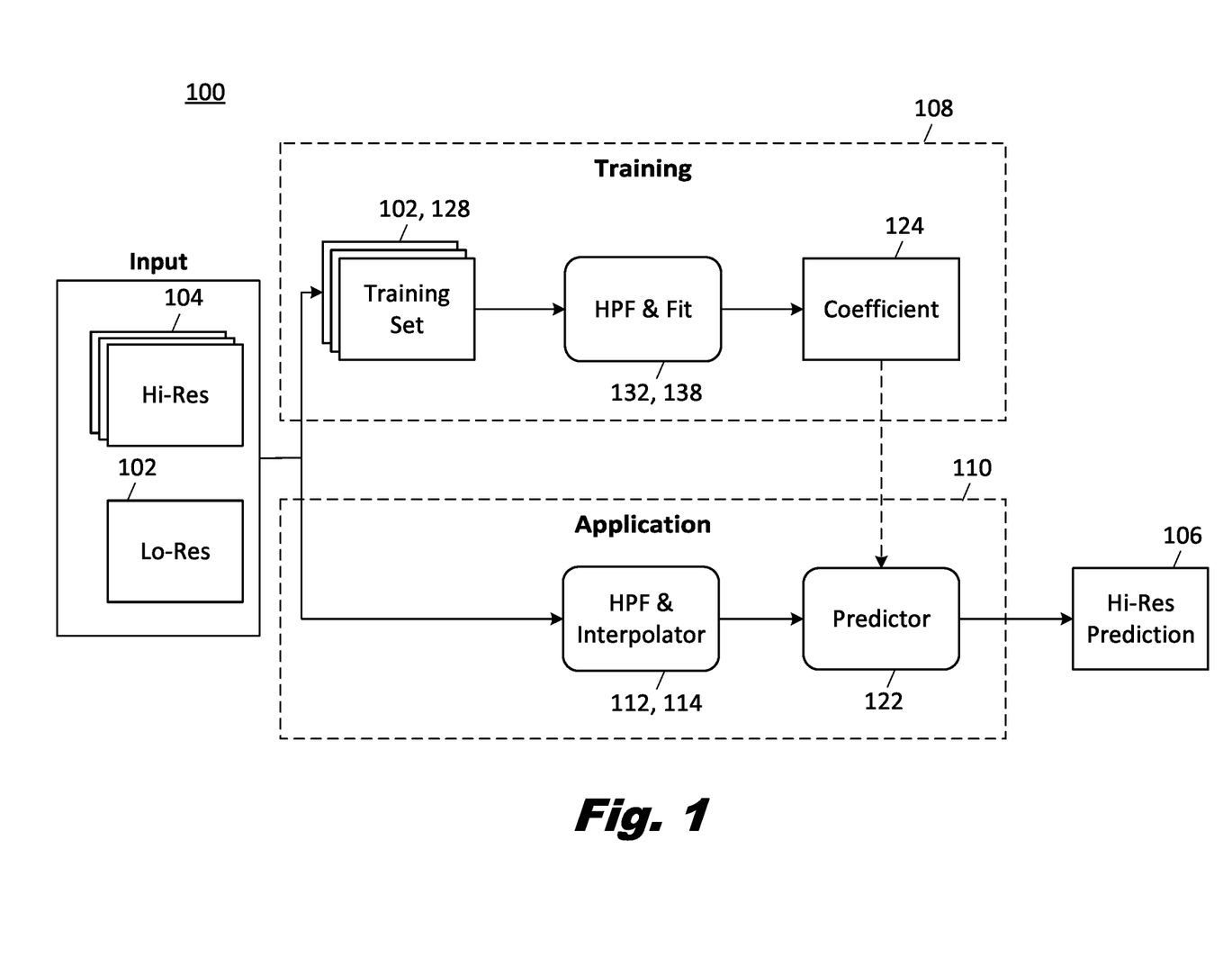
FIG. 1 is a schematic view of an exemplary embodiment of a method of enhancing an image in accordance with the present disclosure, showing a process overview including training and application of the training.

Reference will now be made to the drawings wherein like reference numerals identify similar structural features or aspects of the subject disclosure. For purposes of explanation and illustration, and not limitation, a partial view of an exemplary embodiment of a method in accordance with the disclosure is shown in FIG. 1 and is designated generally by reference character 100. Other embodiments of methods in accordance with the disclosure, or aspects thereof, are provided in FIGS. 2-4, as will be described. The systems and methods described herein can be used for enhancement of images from one band using one or more images from another band.

Figure 2:
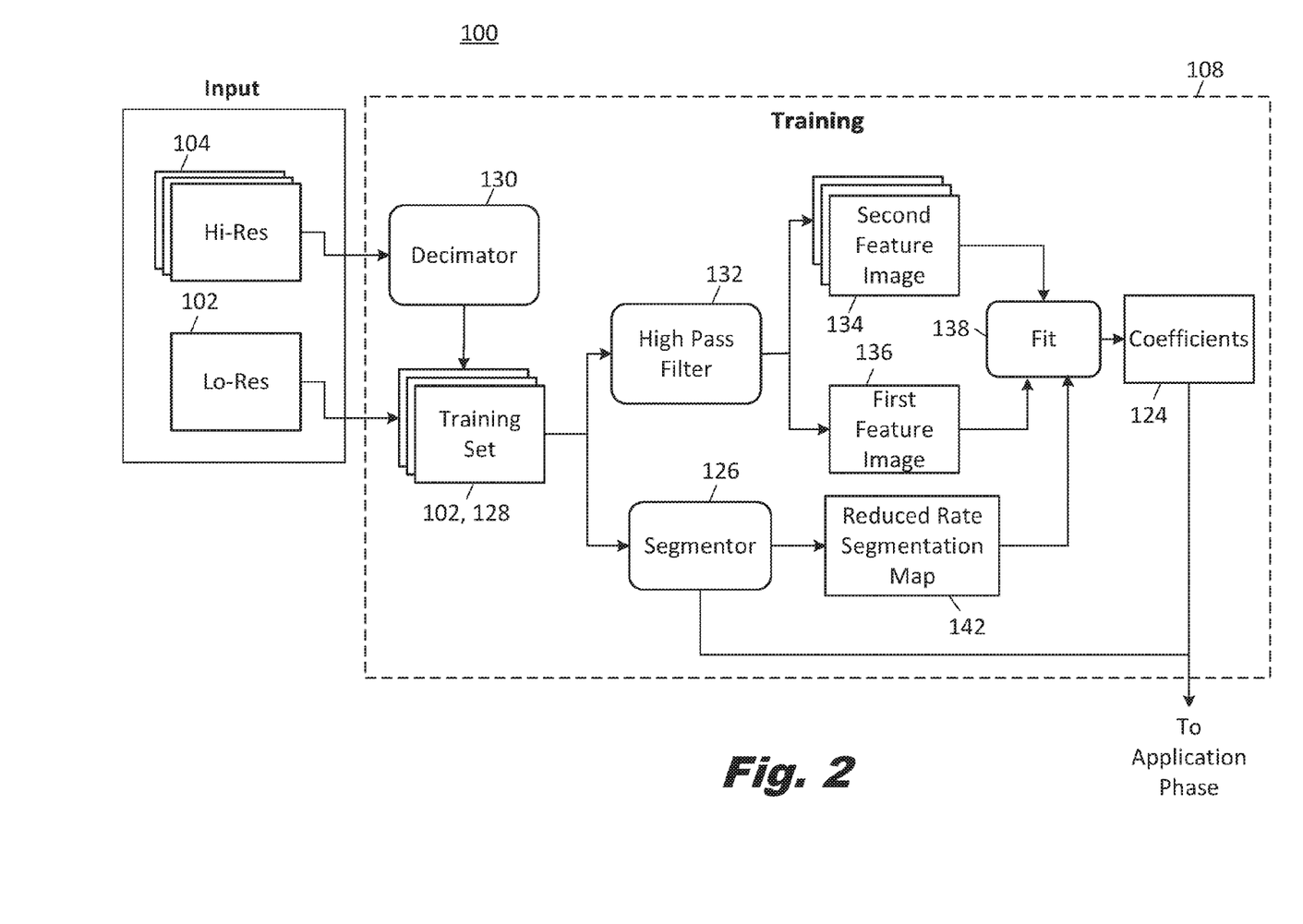
FIG. 2 is a schematic view of the method of FIG. 1, showing the training process.
Figure 3:
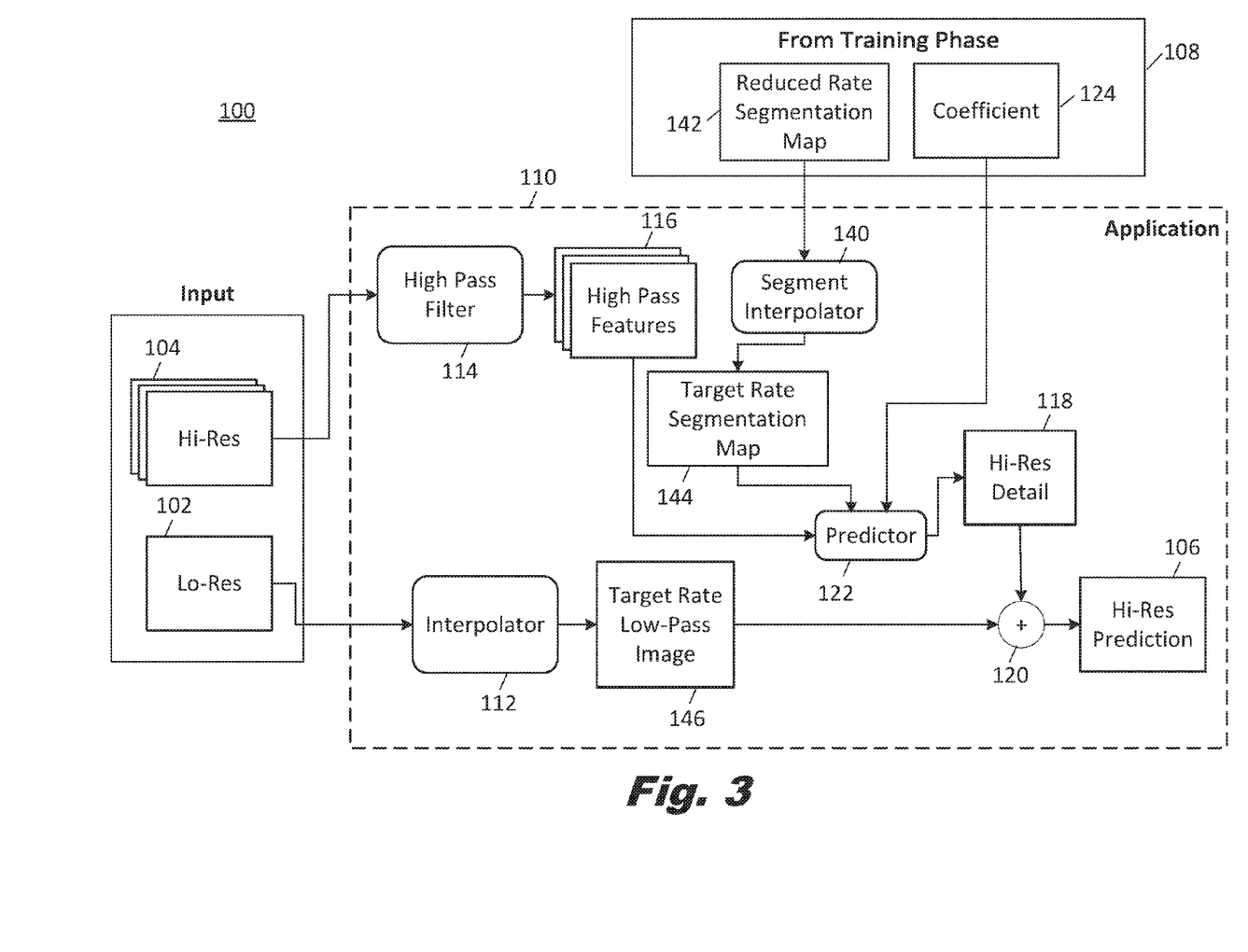
FIG. 3 is a schematic view of the method of FIG. 1, showing the application process.

Method 100 of enhancing an image includes enhancing a first image 102 from a first spectral band/modality using detail extracted from one or more second images 104 from respective second spectral bands/modalities to produce an enhanced image 106. For example, the first image 102 can be an image from a low resolution sensor in a multi-spectral imaging system at a reduced sampling rate, and second images 104 can be images from higher resolution sensors in the same system at the target sampling rate. While FIGS. 1-3 show three images 104, those skilled in the art will readily appreciate that any suitable number of images 104, including only one image, can be used. The first and second spectral bands can be overlapping or non-overlapping. As shown in FIG. 1, method 100 includes using images 102 and 104 as inputs to a training operation or phase 108, as well as to an application operation or phase 110 which uses results from the training phase 108 to produce enhanced image 106. While shown and described herein in the exemplary context of having a single first image 102, e.g., a low-resolution band, those skilled in the art will readily appreciate that multiple low-resolution bands can be processed together using the systems and methods disclosed herein.

It should be noted that resolution in the existing literature can refer to the sampling rate (sampling interval) or the amount of high-frequency information present in an image. For example, there could be an image very finely sampled (high resolution) but also extremely blurry and lacking any high frequency detail (low resolution). For purposes of making this distinction clear in this disclosure, sampling rate specifies how finely an image is sampled and resolution specifies how much detail it has. Note that in this sense the interpolation operation increases the sampling rate but can end up decreasing the original resolution as the image can undergo a certain amount of blurring in the interpolation process.

With reference now to FIG. 2, training phase 108 includes creating a reduced sampling rate copy 128 of the one or more second images 104, as indicated by decimation operation 130. The decimation operation is well known to those skilled in the art. For example, if the sampling rate is reduced by an integer factor f, one can average blocks of f×f pixels to produce the reduced rate image. The reduced sampling rate copies 128 of the one or more second images 104 together with the first image 102 make up a training set, which are used to produce the output of training phase 108. Training phase 108 also includes processing the reduced sampling rate copy 128 of each second image 104 and the first image 102 through a high pass filter, as indicated by box 132 in FIG. 2, to form second and first feature images 134 and 136, respectively.

In one embodiment, the training set of first and second images (e.g., 102, 128) are fed to a segmentor 126 that produces a segmentation map at the reduced rate as indicated by the reduced rate segmentation map 142. Segmentation operations are well known to those skilled in the art and any suitable technique or techniques such as Gaussian mixture models or k-means may be employed for this purpose. The segmentation criterion can be spectral similarity in the case of multi-spectral images. Any other appropriate similarity criterion may also be used in the case of images from different modalities. The segmentor 126 may further sub-divide the segments into smaller regions so that they span a local area to better model the changing characteristics of the image and improve the prediction of the enhanced image 106. The size of the local regions is controlled by a user specified parameter. In an embodiment, the Gaussian mixture model is used to perform the segmentation followed by a further sub-division of the segments into blocks that do not exceed 128×128 pixels, for example.

Training phase 108 further includes processing each of the first and second feature images 134 and 136 and the reduced rate segmentation map 142 through a fit process 138 to generate the prediction coefficients 124. The fitting process 138 learns a different set of coefficients for each of the different regions in the segmentation map. In this manner, the segmentation map and prediction coefficients allow for object or context specific sharpening or enhancement that can vary spatially within the image space.

The fitting operation 138 and the generation of the coefficients 124 will now be described in detail. Note that all images in the fitting process of the training phase 108 are at the reduced sampling rate.

For each segment s, the second image data 134 can be arranged in a matrix $X_s$ of size $M(s) \times N_f$ where each row is a pixel in segment s and the columns are the $N_f$ bands in second feature image data 134. Here, $M(s)$ denotes the number of pixels in segment s. The corresponding first feature image data 136 can be arranged similarly in a matrix $Y_s$ of size $M(s) \times N_p$, where the rows correspond to the pixels in $X_s$ and the columns are the $N_p$ bands of the first image feature data 136. As shown in FIG. 2, $N_p=1$, but those skilled in the art will readily appreciate that multiple bands can be enhanced at the same time.

Employing a linear prediction model $\hat{Y}_s = X_s C_s$ to predict the first feature image from the second feature image, the optimization problem to compute the optimal coefficients is given as $$\min_{C_s} \sum \mathrm{diag}(E_s' E_s), \qquad (1)$$

where diag( ) denotes an operator to extract all the diagonal entries of a matrix into a vector that are subsequently added up by the summation operator, $E_s$ is the prediction error matrix given as $$E_s = Y_s - X_s C_s, \qquad (2)$$

and $C_s$ is the $N_f \times N_p$ prediction coefficient matrix for segment s. The closed form solution of eq. (1) for the optimal coefficients is given as $$C_s = (X_s' X_s)^{-1} X_s' X_s, \qquad (3)$$

where the superscript t denotes matrix transposition.

If the number of pixels in a segment $M(s)$ is small relative to the number of coefficients $N_f$ to be estimated for each prediction band, the optimization problem of eq. (1) may become ill-posed. It is desirable to include some a priori information to make the problem well-posed. Those skilled in the art will readily appreciate that such an approach is known as regularization. Since we are predicting the detail image, a reasonable approach is to reduce the magnitude of the prediction coefficient so the predicted detail image automatically goes towards zero when there is little or no information to be extracted from the data. Towards this end, we modify the original optimization problem given by eq. (1) to penalize the magnitude of the estimated prediction coefficients $$\min_{C_s} \left( \sum \mathrm{diag}(E_s' E_s) + \lambda \sum \mathrm{diag}(C_s' C_s) \right). \qquad (4)$$

Here $\lambda$ is a user supplied parameter that controls the strength of our a priori information. The solution obtained from eq. (4) will be biased towards zero. The amount of bias depends on the amount of data present in the training for segment s. If the number of pixels $M(s)$ is large, the bias will be negligible and the data will determine the unknown coefficients. When there is little or no information ($M(s)$ is small), the a priori information takes over and the magnitude of the prediction coefficients will dial back to zero providing little or no enhancement to the low-resolution image.

The closed form solution of eq. (4) for the optimal coefficients is given as $$C_s = (A_s' A_s)^{-1} A_s' \overline{Y}_s, \qquad (5)$$

where $$A_s = \begin{bmatrix} X_s \\ \sqrt{\lambda} I \end{bmatrix} \qquad (6)$$

and $$\overline{Y}_s = \begin{bmatrix} Y_s \\ Z \end{bmatrix}. \qquad (7)$$

Here I is an $N_f \times N_f$ identity matrix and Z is an $N_f \times N_p$ matrix of zeroes.

If the pixel values in the images are corrupted or the segment boundaries are such that some pixels do not fit the linear prediction model in that segment, the estimated prediction coefficients using eqs. (1) or (4) may be unduly biased. Even though the number of these outlying pixels may be small, their influence on the estimated prediction coefficients may be disproportionately large. It is desirable to remove these pixels in the fitting process so that the prediction of the good pixels are not affected. This can be done by introducing weights for each pixel in the optimization criterion of eqs. (1) and (4), and estimating the weights based on how well the pixel fits the model. Such a procedure is known as robust fitting and those skilled in the art will be familiar with the required modifications to the optimization criterion.

With reference now to FIG. 3, application phase 110 is shown in greater detail. Method 100 includes, in the application phase 110, increasing sampling rate of a first image to a target sampling rate to form an interpolated low-pass image 146, by the interpolation operation 112 in FIG. 3.

This increase in sampling rate can include any suitable interpolation operation on first image 102. In an embodiment, bi-cubic interpolation is employed. At least one of the one or more second images 104 is at the target sampling rate, and at a higher level of detail or resolution than that of the first image 102. Application phase 110 includes processing the one or more second images 104 through a high pass filter, as indicated in FIG. 3 by box 114, to form one or more respective high pass features images 116. Application phase 110 of method 100 also includes extracting detail 118 relevant to the first image 102 from the one or more high pass features images 116, merging the detail 118 with the interpolated low-pass image 146, as indicated by merger process 120 in FIG. 3, to form prediction image 106 at the target sampling rate in the first band. This prediction image 106 can be a resolution enhanced version of the original image 102. Method 100 can include outputting the prediction image 106 in any suitable format.

Extracting detail from the high pass features image relevant to the first image is done on a segment by segment basis from the high pass features images 116 for use in merging with the interpolated image, as indicated by box 122 in FIG. 2. Extracting detail for each segment is governed by individualized prediction coefficients 124, which are derived from the training phase 108 described above. Detail extraction includes receiving a target rate image segmentation map 144 and receiving prediction coefficients 124 corresponding to respective segments of the image segmentation map 144 for extracting detail on a segment by segment basis. The coefficients are constant within each segment, wherein the segments may be sub-divided to only span a local region.

The training phase 108 generates a reduced rate segmentation map 142 for learning the coefficients for each segment. However, this segmentation cannot be used directly in the application phase 110 as the images are now at the target sampling rate. For this purpose, a segment interpolator 140 is employed to increase the rate of the segmentation map 142 to the target rate segmentation 144. If the segmentation map 142 is stored as an image with pixel values set to the corresponding segment index it is assigned to, nearest neighbor interpolation can then be applied to generate the segmentation map 144 at the target rate. Nearest neighbor interpolation ensures that no new segment indices are created in the interpolation process. Since segmentation maps 142 and 144 have the same number of unique segment indices, the coefficients 124 learned in the training phase 108 can be directly applied in the application phase 110.

Figure 4:
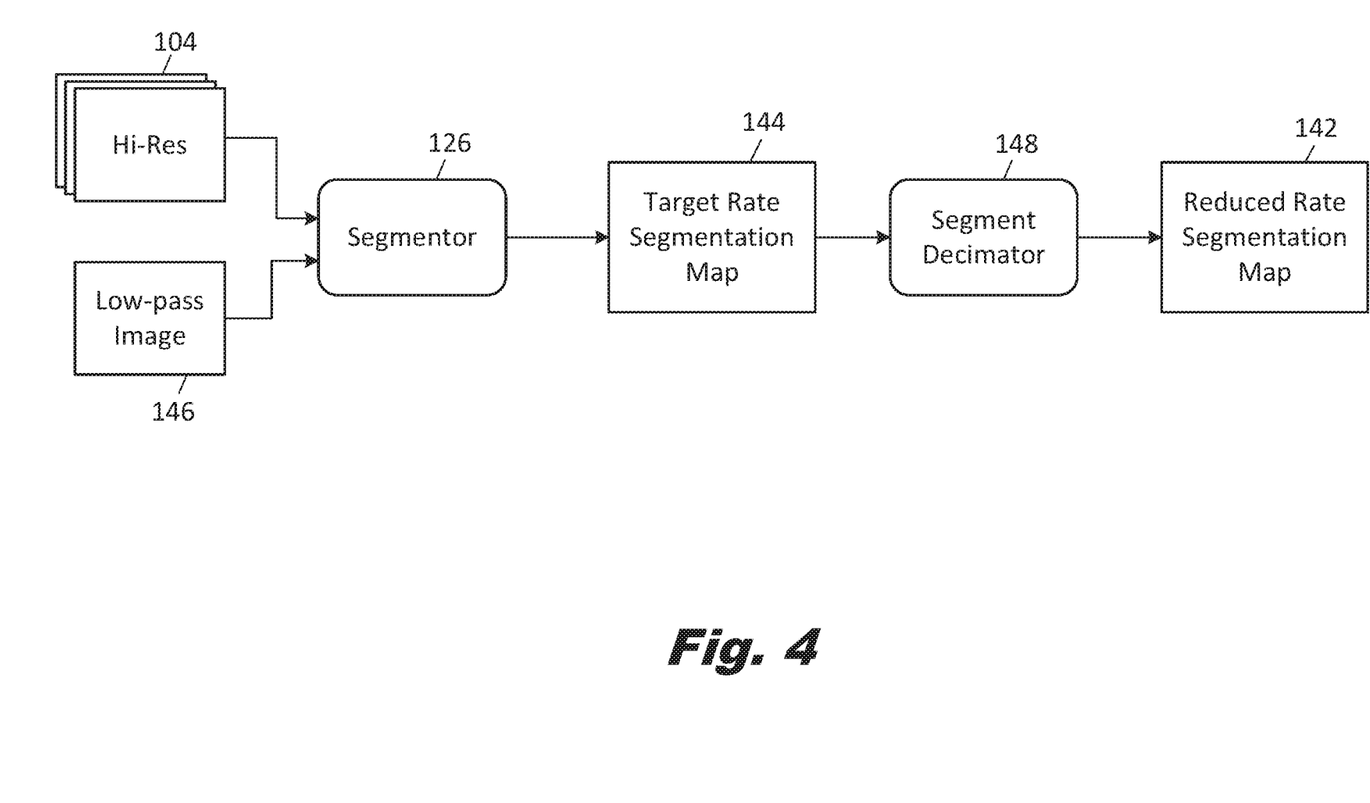
FIG. 4 is a schematic view of another exemplary embodiment of a process for generating segmentations maps in accordance with the invention.

FIG. 4 shows another exemplary embodiment for generating the segmentation maps 142 and 144. In this case, the target sampling rate images 104 and 146 are fed to the segmentor 126 to produce the segmentation map 144 at the target sampling rate. The segment decimator 148 can then be used to generate the reduced sampling rate segmentation map 142. Note that reducing the sampling rate of the segmentation map 144 should not produce any new segment indices. To facilitate this process, the segmentation map 144 is stored as an image with pixel values set to the corresponding segment index it is assigned to, and the sampling rate is reduced by a normal decimation operation where instead of averaging f×f blocks of pixels (f being the down-sampling factor) the mode (segment index that occurs the most number of times in the f×f block of pixels) is taken to generate the reduced rate segmentation map 142.

The predictor 122 for extracting the detail image 118 and the generation of the enhanced image 106 will now be described in detail. For each segment s, the data in the high-pass feature images 116 is put into the matrix $X_s$ of size $M(s) \times N_f$ in the same manner as was done in the training phase 108. Note that M(s), the number of pixels in segment s, will be different in the application phase 110 than the training phase 108 since all the images in the application phase are at the target sampling rate whereas they were at the reduced sampling rate in the training phase. The coefficients 124 matrix for segment s learned in the training phase is then post multiplied with $X_s$ to obtain the detail image 118 $X_s C_s$ for segment s. These details are relevant to the first image 102. The entire detail image can be constructed by repeating the process for all segments s. The detail image $X_s C_s$ can optionally be multiplied by a user specified sharpening gain α that controls the sharpness of the enhanced image. The value of α=1 can provide optimal prediction. Values of α>1 boost the high-frequency content whereas values of α<1 subdue it. The parameter α may be set based on personal preference.

In matrix notation, the enhanced data 106 for each segment s is obtained as $$Y_s^{(e)} = Y_s^{(l)} + \alpha X_s C_s \quad (8)$$

where the matrix $Y_s^{(l)}$ denotes the data in segment s for the low-pass image 146 obtained by interpolation of the first image 102 and $Y_s^{(e)}$ denotes the prediction for the enhanced image 106 for segment s. Eq. (8) can be repeated for each segment s to reconstruct the complete enhanced image 106 at the target sampling rate.

Although low- and high-pass components of the images can be produced by filters either in the spatial or frequency domain as will be appreciated by those skilled in the art, a satisfactory approach is to use the interpolation and decimation operations to generate these components primarily because these operations are already applied elsewhere in the algorithm. Let X denote an image at a particular sampling rate. The low-pass component $X^{(l)}$ at the same sampling rate can be generated by first decimating the image to a reduced rate followed by interpolating back to the same rate $$X^{(l)} = IDX. \quad (9)$$

where D is the image decimation operator to go from the target sampling rate to the reduced sampling rate and I is the image interpolation operator to go from the reduced sampling rate to the target sampling rate. The high-pass component $X^{(h)}$ can be produced by subtracting the low-pass component from the original image $$X^{(h)} = X - X^{(l)} = X - IDX. \quad (10)$$

One can use averaging of the super-pixel for the decimation and bi-cubic interpolation.

The bandwidth of the high- and low-pass images produced in this manner is controlled by the decimation/interpolation factor f and is a user specified parameter that can be chosen based on the desired bandwidth of detail information that needs to be transferred to the first image. The default decimation/interpolation factor is kept to be the same as the ratio between the sampling rates of the high- and low-resolution images. However, a larger factor can also be used if the high and/or the low-resolution images are oversampled or blurred and there is little or no high-frequency content that can be transferred from the high-resolution images or learned from the low-resolution images at the default decimation factor.

If the number of high-resolution bands is large, $N_f \gg 1$, it may be possible to improve the computational efficiency of the algorithm by leveraging redundancies between the bands. Principal component analysis is a well known method for compacting the available information in a fewer number of bands. The remaining bands can then be discarded with minimal loss of information. The number of transformed bands to retain can be chosen based on a user specified parameter that controls the amount of information to be retained. For example, one can choose 95% of the variance to be retained in the transformed space. The algorithm specified above is equally applicable in the transformed PCA space and no modifications are necessary. Other compression methods may also be used in conjunction with the proposed method.

While described herein in the exemplary context of a method, those skilled in the art will readily appreciate that the processes described herein can be implemented on any suitable system, such as a computing device with interconnected input/output interfaces, memory, and one or more processors, wherein a module of the system is configured to implement machine readable instructions to perform any embodiment of the operations described above.

Systems and methods disclosed herein transfer the high-resolution information from one or more images to another, lower resolution image using correlations that exist between the image or images with the high-resolution information and the image being enhanced. Since this correlation varies depending on what is being imaged, the segmentation algorithm described herein can be employed to divide the image into regions where the correlation remains constant, or nearly constant. Traditional methods only tend to work well when there is a spectral overlap between the higher-resolution band and the lower-resolution band, and they typically only utilize information from a single higher-resolution band. Moreover, in the traditional methods, the amount of sharpening cannot be controlled. In systems and methods as disclosed herein, these short comings are overcome since information from multiple higher-resolution bands can be transferred to multiple lower-resolution bands, no spectral overlap is required, and the amount of sharpening can be controlled on a spectral properties context or object specific basis that can vary throughout an image. Methods and systems disclosed herein are guaranteed to produce images equal or better in sharpness than interpolation methods, wherein the increase in sharpness over interpolation methods depends on registration and correlation between the bands used, and the amount of high frequency information in the higher-resolution band or bands.

Those skilled in the art will readily appreciate that although methods have been described herein for images of different spectral bands acquired at differing resolutions, the techniques can be equally applicable to different resolution images acquired using differing modalities. The segmentation criterion can be modified from spectral similarity to some other suitable measure of similarity that makes the prediction model more applicable across modalities.

The methods and systems of the present disclosure, as described above and shown in the drawings, provide for image enhancement with superior properties including superior enhancement even when there is no overlap between the band being enhanced and the band or bands used for the enhancement. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of enhancing an image comprising:
   increasing sampling rate of a first image to a target sampling rate to form an interpolated image;
   processing a second image through a high pass filter to form a high pass features image, wherein the second image is at the target sampling rate;
   extracting detail from the high pass features image;
   merging the detail from the high pass features image with the interpolated image to form a prediction image at the target sampling rate;
   outputting the prediction image;
   processing at least one additional image through a high pass filter to form at least one respective additional high pass features image; and
   extracting detail from the at least one additional high pass features image, wherein merging the detail from the high pass features image with the interpolated image includes merging detail from the at least one additional high pass features image to form the prediction image.

2. The method as recited in claim 1, wherein the first image is from a first spectral band, the second image is from a second spectral band, and wherein the at least one additional image is from at least one respective additional spectral band.

3. The method as recited in claim 1, wherein the at least one additional image is at a higher resolution than the first image.

4. The method as recited in claim 1, wherein the first image is from a first spectral band, the second image is from a second spectral band, and wherein the first and second bands are overlapping.

5. The method as recited in claim 1, wherein the first image is from a first spectral band, the second image is from a second spectral band, and wherein the first and second bands are non-overlapping.

6. A method of enhancing an image comprising:
   increasing sampling rate of a first image to a target sampling rate to form an interpolated image;
   processing a second image through a high pass filter to form a high pass features image, wherein the second image is at the target sampling rate;
   extracting detail from the high pass features image;
   merging the detail from the high pass features image with the interpolated image to form a prediction image at the target sampling rate; and
   outputting the prediction image, wherein extracting detail from the high pass features image is done on a segment by segment basis from the high pass features image for use in merging with the interpolated image, wherein extracted detail for each segment is governed by individualized prediction coefficients, wherein extracting detail includes receiving an image segmentation map for segmenting the high pass features image and receiving prediction coefficients corresponding to respective segments of the image segmentation map for extracting detail on a segment by segment basis.

7. The method as recited in claim 6, wherein receiving the image segmentation map and receiving the prediction coefficients includes receiving the image segmentation map and prediction coefficients from a training operation, wherein the training operation includes:
   creating a reduced sampling rate copy of the second image;
   processing the reduced sampling rate copy of the second image and the first image through a high pass filter to form second and first feature images, respectively;
   processing the reduced sampling rate copy of the second image and the first image through a segmentation operation to produce the segmentation map; and
   processing the first and second feature images and the segmentation map through a fit process to generate the prediction coefficients.

8. The method as recited in claim 7, wherein creating a reduced copy of the second image includes creating a reduced sampling rate copy of at least one additional image, and wherein the segmentation map and prediction coefficients are based on the second image and the at least one additional image.

9. The method as recited in claim 6, wherein extracting detail from the high pass features image includes increasing the sampling rate of the segmentation map to the target sampling rate.

10. The method as recited in claim 6, wherein coefficients are constant within each segment, wherein the segments are sub-divided to only span a local region.

11. The method as recited in claim 1, wherein processing the second image through a high pass filter includes decimating the second image to a reduced sampling rate and then interpolating back to the target sampling rate and subtracting this result from the second image to produce the high pass features image.

12. A method of enhancing an image comprising:
increasing sampling rate of a first image to a target sampling rate to form an interpolated image;
processing a second image through a high pass filter to form a high pass features image, wherein the second image is at the target sampling rate;
extracting detail from the high pass features image;
merging the detail from the high pass features image with the interpolated image to form a prediction image at the target sampling rate; and
outputting the prediction image, wherein merging the detail from the high pass features image with the interpolated image to form a prediction image at the target sampling rate is governed by $$Y_s^{(e)} = Y_s^{(I)} + \alpha X_s C_s,$$

where the matrix $Y_s^{(I)}$ denotes the data in segment s of the interpolated image and $Y_s^{(e)}$ denotes the prediction image for segment s, $X_s$ is a matrix of detail data extracted from the high pass features image for segment s, $C_s$ is a matrix of prediction coefficients for segment s, and $\alpha$ is a sharpening gain.

13. The method as recited in claim 12, wherein $\alpha=1$.

14. A method of enhancing an image comprising:
increasing sampling rate of a first image to a target sampling rate to form an interpolated image;
processing a second image through a high pass filter to form a high pass features image, wherein the second image is at the target sampling rate;
extracting detail from the high pass features image;
merging the detail from the high pass features image with the interpolated image to form a prediction image at the target sampling rate; and
outputting the prediction image, wherein extracting detail from the high pass features image is done on a segment by segment basis from the high pass features image for use in merging with the interpolated image, wherein extracted detail for each segment is governed by individualized prediction coefficients, further comprising generating a segmentation map based on the interpolated image and the second image, wherein the second image and the interpolated image are processed through a segmentation algorithm to produce a segmentation map at the target sampling rate for use in extracting detail from the high pass features image on a segment by segment basis.

15. The method as recited in claim 1, wherein the first image is from a first modality, the second image is from a second modality, and wherein the first and second modalities are different from one another.

16. A system for enhancing images including:
a processor configured to implement machine readable instructions to perform a method of enhancing an image comprising:
increasing sampling rate of a first image to a target sampling rate to form an interpolated image;
processing a second image through a high pass filter to form a high pass features image, wherein the second image is at the target sampling rate;
extracting detail from the high pass features image;
merging the detail from the high pass features image with the interpolated image to form a prediction image at the target sampling rate; and
outputting the prediction image, wherein the machine readable instructions include instructions for:
processing at least one additional image through a high pass filter to form at least one respective additional high pass features image; and
extracting detail from the at least one additional high pass features image, wherein merging the detail from the high pass features image with the interpolated image includes merging detail from the at least one additional high pass features image to form the prediction image.

17. The system as recited in claim 16, wherein the machine readable instructions include instructions wherein extracting detail from the high pass features image is done on a segment by segment basis from the high pass features image for use in merging with the interpolated image, wherein extracted detail for each segment is governed by individualized prediction coefficients.

* * * * *